United States Patent Office 2,799,047
Patented July 16, 1957

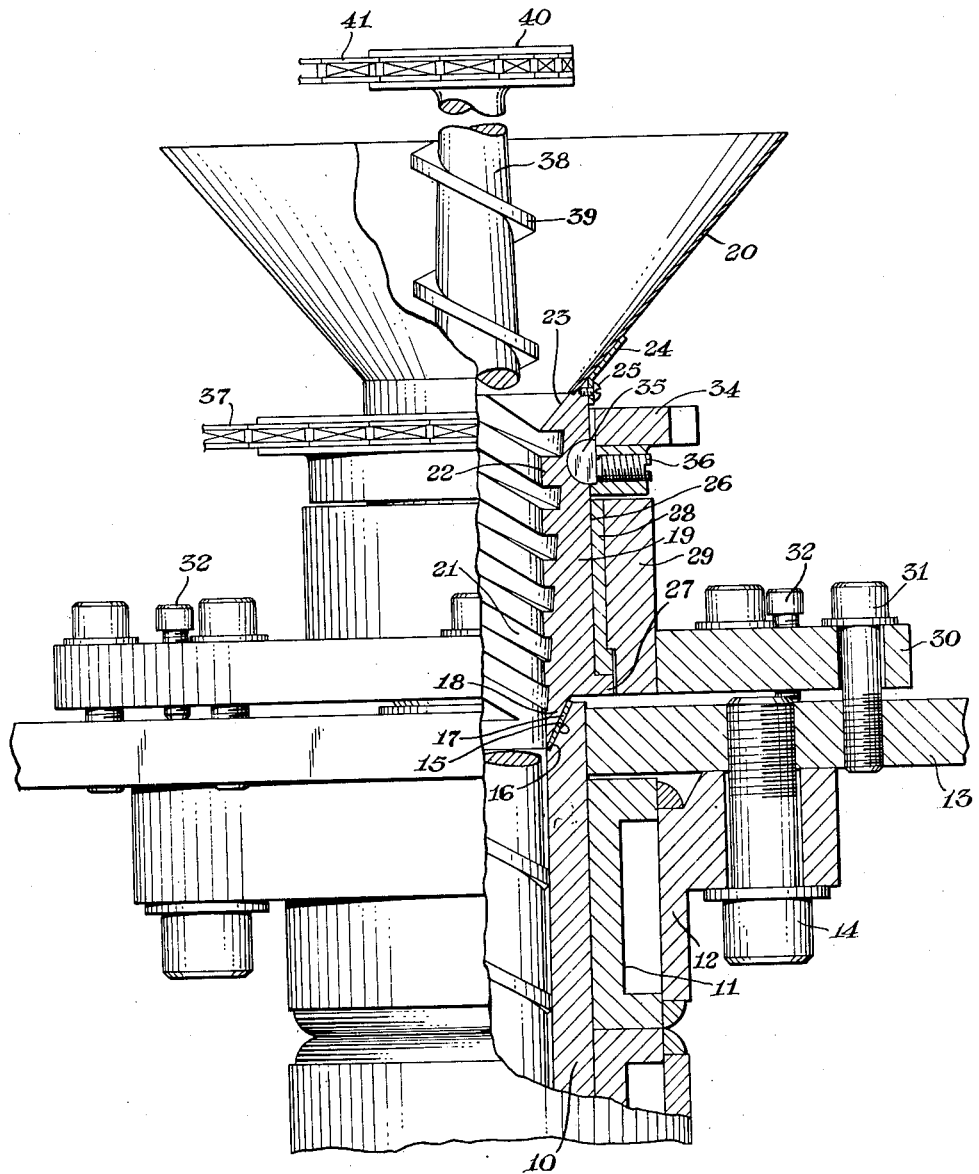

2,799,047

ROTARY HOPPER FOR EXTRUDERS AND THE LIKE

Almar T. Widiger, Midland, and Forrest R. Lennox, Coleman, Mich., assignors to The Dow Chemical Company, Midland, Mich., a corporation of Delaware Application September 29, 1955, Serial No. 537,440

1 Claim. (Cl. 18—12)

This invention relates to improved feed apparatus for extruders. More particularly, it relates to a rotary hopper for use with extruders.

Conventional extruding machines for fabricating thermoplastic polymers are most usually fed from a funnel-shaped hopper into which the polymer granules are poured. The granules then pass by gravity into the screw section of the extruder. It is necessary that the hopper and screw section be kept full if the extruder is to operate at peak efficiency. With many thermoplastic polymers the feed characteristics are so poor that some of the polymer granules hang up on the wall of the hopper and it requires manual or mechanical scraping or jarring to provide positive feeding into the extruder. In the past, the mechanical means have consisted of helical fins attached to a rotatable shaft to scrape the inner walls of the hopper, or mechanical vibrators attached to the hopper. Those means have helped the feed problem somewhat when low rates of extrusion are used, but are not efficient enough for feeding granules when very high rates of extrusion are used.

It is an object to provide an improved feeding apparatus for extruders and the like.

It is a further object to provide such an improved feeding apparatus which has positive feeding characteristics and whose rate of feeding may be varied within wide limits.

The above and related objects are accomplished by providing a conventional vertical extruder with a rotatable hopper having a rotatable screw operating therein. The hopper is capable of being rotated in either a clockwise or a counter-clockwise direction, and, thus, may be turned in rotation or in counter-rotation to the screw.

The construction and operation of the feed apparatus of this invention will be more apparent from the following description and annexed drawing which illustrates a preferred embodiment of the apparatus. In the drawing the single figure is a fragmentary vertical elevation of the apparatus, partially in section.

In the illustrated embodiment, the rotary hopper is mounted in cooperation with a conventional vertical extruder. The extruder 10 has jackets 11 for circulating heat transfer fluids. Attached to the outer surface of the jackets 11 are brackets 12 for supporting the rotary hopper and auxiliary members. Mounted about the extruder barrel 10 and above the upper jacket 11 is a collar plate 13 secured in place by bolts 14 to the brackets 12.

The upper edge of the extruder barrel 10 has a conically tapered inner surface 15. The tapered surface 15 terminates in a shoulder 16 so that the tapered surface 15 and shoulder 16 form a bearing seat. A conical thrust bearing 17 is fitted into the bearing seat. That bearing 17 aligns the rotary hopper with the extruder barrel 10 and takes up both end and radial thrust.

The feed apparatus has a lower portion 18 which is conically tapered to seat in the bearing seat. The feed apparatus consists of a flighted section 19 and a funnel section 20. The inner surface of the flighted section 19 is of the same diameter as the inner surface of the extruder barrel 10 and forms a continuum with the inner surface of the extruder barrel 10 at the bearing seat. A helical groove 21 is cut into the inner surface of the flighted section 19 so that the lands 22 between successive turns of the groove 21 have the same diameter as the extruder barrel 10. The groove 21 has a continuously decreasing root depth from the top of the flighted section 19 to the lower end 18. The lower end 18 of the groove 19 is preferably flush with the inner surface of the lands 22 to prevent the formation of a pocket where polymer could be trapped and decompose. The tapered groove 21 may be of constant or of decreasing pitch, and provides a compressive action to deliver a compacted material to the extruder. The flighted section is flared outwardly at the top 23 and the funnel section 20 is fitted thereto as by means of brackets 24 which may be welded to the funnel section 20 and fastened to the flighted section 19 by means of bolts 25.

The outer surface 26 of the flighted section 19 is a polished bearing surface. At the lower end of the outer surface 26 but above the conically tapered portion 18 is a radially projecting rim 27. Resting on the rim 27 and in sliding contact with the outer surface 26 of the flighted section 19 is a metallic bushing 28 press-fitted into a cylindrical housing 29 which is welded at its base to a radially disposed flange 30. The flange 30 and cylinder 29 are secured in spaced relationship above plate 13 with bolts 31 projecting through the flange 30 and into collar plate 13. To make fine alignment adjustments, bolts 32 are threaded through flange 30 and press against the upper surface of the collar 13. Adjustments of bolts 32 are easily made to prevent binding of the rotary members in bushing 28 or at seat 17.

Above the cylinder 29 and bushing 28 is a sprocket 34 connected to the flighted section 19 through a key 35 and setscrew 36. The key 35 and keyway are of such a shape as to prevent any appreciable longitudinal movement of the sprocket 34 in addition to providing a positive connection between the sprocket 34 and flighted section 19. A chain 37 or notched cable connects the sprocket 34 with a suitable source of power (not shown).

Extending coaxially through the funnel 20 and flighted section 19 of the feed apparatus is a modified extruder screw 38. The portion of the screw 38 passing through the funnel 20 and flighted section 19 has a helical flight 39 to the bottom of the flighted section 19. The flight 39 is of the same diameter as the diameter between lands 22 of the flighted section 19 so as to provide an additional forwarding action to the plastic particles. The screw 38 is connected to a suitable source of power (not shown), as by sprocket 40 and chain 41.

EXAMPLE

A 1¼ inch vertical extruder was equipped with a rotary hopper, the flights of which had a ½ inch pitch, and in which the root of the square spiral grooves tapered at a nine degree angle from the vertical axis of the extruder. The extruder was operated in all instances at 12 R. P. M. clockwise, and the temperature of the barrel was maintained constant at 180° C. Under such constant conditions the rate of extrusion in pounds per hour is a measure of the feeding efficiency of the hopper. The material extruded was a standard commercially available saran copolymer. The results of the tests of the rotary hopper are summarized in Table I.

Table I

| Hopper (R. P. M.) | Direction of Rotation of Hopper | Extrusion Rate (lbs./hr.) |
| --- | --- | --- |
| 0 | | 7.8 |
| 2 | Counterclockwise | 10.4 |
| 6 | do | 12.0 |
| 8 | do | 13.5 |

From the above table it can be seen that operating the hopper at only 2 R. P. M. in counter-rotation to the screw produced an increase of 33 percent in the output of the apparatus.

We claim:

A vertically disposed plastics extruder having a heated barrel, a plastics forwarding screw in said barrel, and a positive plastics feeding means at its upper end, said means comprising: a conical bearing seat in the upper end of the barrel, a feed cylinder having a matching conical bearing at its lower end mounted for axial rotation in said seat, at least one helical groove extending the length of said cylinder in the inner wall thereof, each said groove having a diminishing root diameter as it approaches said seat, a conical hopper affixed to the upper end of the feed cylinder, an extension of said plastics forwarding screw projecting upward through said cylinder and said hopper, and means for rotating said forwarding screw and for rotating said feed cylinder and associated hopper independently of one another.

References Cited in the file of this patent

UNITED STATES PATENTS 2,547,151     Braeseke     Apr. 3, 1951